United States Patent [19]

Strecker

[11] 4,205,970
[45] Jun. 3, 1980

[54] CENTRAL GAS SUPPLY SYSTEM AND FILTER ADAPTER THEREFOR

[75] Inventor: Helmut Strecker, Bad Schwartau, Fed. Rep. of Germany

[73] Assignee: Drägerwerk Aktiengesellschaft, Fed. Rep. of Germany

[21] Appl. No.: 915,246

[22] Filed: Jun. 13, 1978

[30] Foreign Application Priority Data

Jun. 18, 1977 [DE] Fed. Rep. of Germany ....... 2727430

[51] Int. Cl.² .................. B01D 46/42; A61L 9/00; A61B 19/00
[52] U.S. Cl. ........................... 55/279; 55/417; 55/420; 55/505; 422/120
[58] Field of Search .............. 55/279, 417, 420, 498, 55/502, 505, 510, DIG. 35; 210/429, 430; 251/149.6, 149.7; 137/549; 128/188.1 R; 21/74 R

[56] References Cited

U.S. PATENT DOCUMENTS

| | | | |
|---|---|---|---|
| 2,468,340 | 4/1949 | Mirassou | 55/279 |
| 2,722,399 | 11/1955 | Oetiker | 251/149.6 |
| 2,730,382 | 1/1956 | De Master | 251/149.6 |
| 3,462,117 | 8/1969 | Lind | 251/149.6 |
| 3,538,950 | 11/1970 | Porteners | 251/149.6 |
| 3,704,002 | 11/1972 | Skarzynski | 251/149.6 |
| 3,910,307 | 10/1975 | Jankowski | 251/149.6 |
| 4,063,913 | 12/1977 | Kippel et al. | 55/498 |

FOREIGN PATENT DOCUMENTS 1090498 10/1960 Fed. Rep. of Germany ............ 55/417

Primary Examiner—David L. Lacey
Attorney, Agent, or Firm—McGlew and Tuttle

[57] ABSTRACT

An adapter, particularly for medical gas systems which require sanitary interconnections, comprises a housing which has a gas flow passage therein containing a filter or other sterilizing device with a connection at one end permitting easy coupling to the gas supply line and the housing has another connection for the discharge of the gas after filtering to the place of use.

5 Claims, 3 Drawing Figures

CENTRAL GAS SUPPLY SYSTEM AND FILTER ADAPTER THEREFOR

BACKGROUND OF THE INVENTION

1. Field of the Invention

The invention relates, in general, to hospital gas systems and, in particular, to a new and useful central gas supply system for medicinal gases.

2. Description of the Prior Art

Central gas supply systems in hospitals are used for the constant supply of breathing gas to the patients. In particular, compressed air is used for the operation of instruments and therapeutic apparatus in treatment departments, like operating rooms and intensive care units. The sanitary standards require sterility of the supplied compressed air or of the other gases. A stationary gas supply system, however, can neither be made sterile nor be constantly sterilized.

A gas filter is known in a gas supply system which has an exchangeable filter brush, which is used preferably in precision-made gas-carrying or gas-consuming apparatus for protection against contamination by dust, etc. The thorough cleaning or replacement of the filter insert is a prerequisite for the safe operation of the gas-fed apparatus. In order to avoid gas losses, the filter housing has an inlet valve which is kept open by the inserted brush filter body against the action of a spring. It closes automatically when the filter body is removed. This known filter is not suitable for use at gas intake points for medicinal gases. It is installed directly in the line. The part of the line behind the filter up to the intake point can again become the source of contamination. Sterility of the line directly at the intake point is thus not ensured (See German Pat. No. 1,090,498).

The known plug couplings in gas supply systems consist of a connector socket, for the gas line which is usually secured on the wall, and a plug to which the apparatus is connected, which is plugged into the connector socket. The plug connections contain no means by which sterility of the issuing gas is ensured.

In a known plug connection, the coupling and uncoupling is effected in two directions, where the apparatus, seen in coupling direction, is kept in the first coupling stage in a storage-parking position, while in the second coupling stage, the inlet valve is not yet opened. This is done only when the plug is inserted into the second coupling stage. The connector socket and the plug has gas markings which make wrong couplings with different gases impossible, i.e. the gas is fed from the gas supply system to the consumer directly over the plug connection (see German Pat. No. 1,934,552).

The invention includes an adapter with a plug or a similar connection at one end for connecting it to the gas line and a passage through the housing of the adapter which contains a filter, such as for removing germs or for sterilizing and with a coupling connection at the opposite end of the passage for the connection of a plug or a similar device for the discharge of gas at the place of use.

The advantages achieved with the invention consist in particular in that the sterility of the gas is actually ensured at the intake-point. The adapter, in which the germ filter is arranged, is plugged in a known coupling manner into the connector socket.

The adapter itself ensures by its sterilizability a germ-free connection to the plug, and thus to the consumer of the gas. The marking to designate particular gases ensures the correct plug connection. The different dimensioning of the gas marking ensures that the plug can be connected to the gas supply system only over the adapter. The adapter can be connected according to the invention both with a spring lock and over a screw joint with the gas supply system. Both embodiments ensure a simple detachability, which facilitates the removal of the adapter for the purposes of sterilization.

For a transition period until the parts including connector socket, adapter, and plug are assembled together, the adapter can be inserted with the same plug connection and receiving part immediately into the existing system, to ensure a germ-free gas supply. The required increased attention can be demanded of the personnel, since no serious errors are possible.

Accordingly, it is an object of the invention to provide an improved gas system connection device which advantageously includes an adapter which has one end which is connectable to the gas supply and a passage therein for the flow of gases through the adapter which includes filter, or similar means, for treating the gases and having a discharge connection at the opposite end which may be connected to a plug or similar element for connection to the place of use of the gas.

A further object of the invention is to provide a gas system in a hospital or similar medical treating center for the discharge of gas in a sanitary and germ-free manner which is simple in design, economical to manufacture and rugged in construction.

While a specific embodiment of the invention has been shown and described in detail to illustrate the application of the principles of the invention, it will be understood that the invention may be embodied otherwise without departing from such principles.

GENERAL DESCRIPTION OF THE PREFERRED EMBODIMENT

Figure 1:
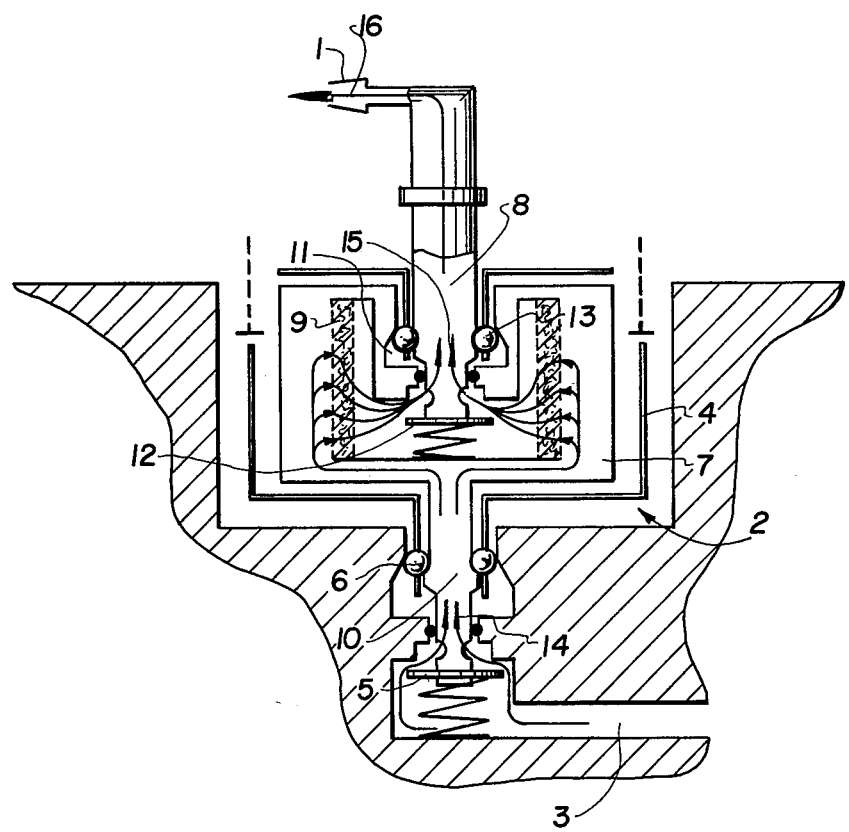
FIG. 1 is a schematic sectional view of a gas connection in a medical gas system with an adapter for treating the gas constructed in accordance with the invention.

Referring to the drawings, in particular, the invention embodied therein in FIG. 1 comprises an adapter system for treating hospital or similar medical installation gases which are delivered from a gas line 3 so that they may arrive at the place of use in a germ-free and uncontaminated manner.

The gas connection 1 is connected through an intake connector assembly 2 with gas line 3 of the central gas supply system. Intake connection assembly 2 comprises a connector socket 4 with inlet valve 5 and spring lock 6, adapter 7 and a plug 8. Adapter 7 contains germ filter 9 which is traversed by the gas. Adapter 7 includes, at the inlet, a plug connection 10, and at the outlet, it has a receiving part 11 for plug 8. Plug connection 10 and the receiving part 11 also serve as a gas marking, that is an indicator for designating specific types of gases. The different diameters also ensure that coupling of plug 8 is only possible over adapter 7. Plug connection 10 opens inlet valve 5 in the plugged-in state. It is held in connector socket 4 by the spring lock. The receiving part 11 contains outlet valve 12 which is opened by insertion of the plug 8. A spring lock 13 of the adapter 7 is provided for holding plug 8. Germ filter 9 is traversed by the gas to be purified radially from the outside to the inside. The sets of arrows 14 and 15 indicate the direction of the flow of the gas. Adapter 7 is completely sterilizable.

Figure 2:
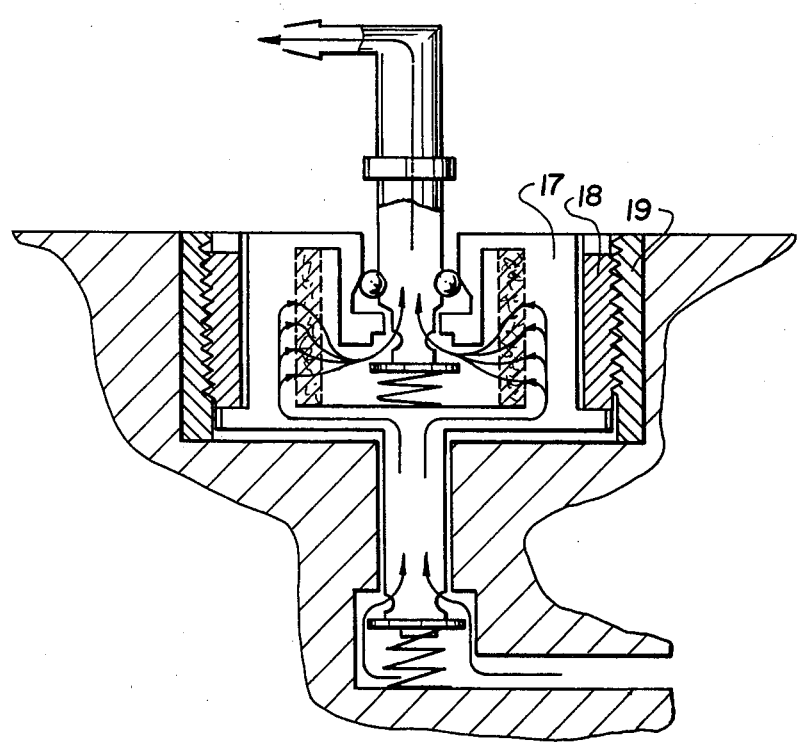
FIG. 2 is a view similiar to FIG. 1 of another embodiment of the invention.
Figure 3:
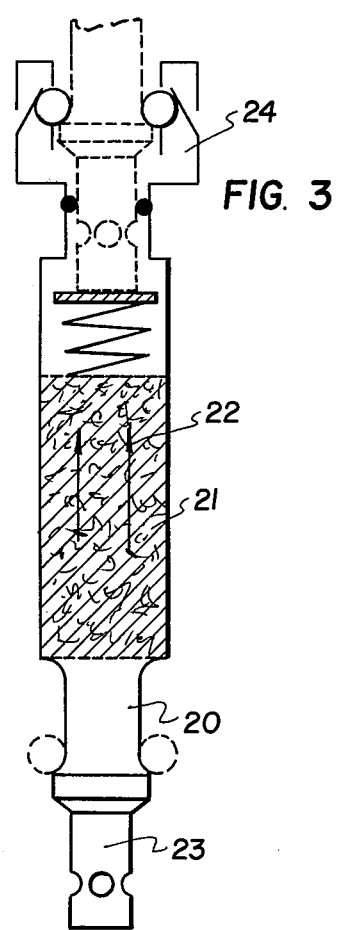
FIG. 3 is a view similar to FIG. 1 of still another embodiment of the invention.

The same holds true for adapter 17 of the embodiment according to FIG. 2. In the design of this embodiment it is held in connector socket 19 by screw joint 18. An adapter 20 according to the embodiment of FIG. 3 differs by the different arrangement of a germ filter 21, which is traversed by the gases axially in the direction of the arrows 22. Adapter 20 can be inserted into the existing connector-socket and also receives the plug with the same design of the gas marking on plug connection 23 and receiving part 24, and thus ensures proper dimensioning as an intermediate solution without alterations of the system.

The adapters 7, 17 and 20 are advantageously made to a distinct connection or coupling size for each gas which would normally be used in the medical facility or similar location so that only connecting plugs of the size selected for the particular gas may be interconnected. Each adapter may contain a germ filter or other sterilizing filter or device, and they preferably include means for effecting the locking of the connecting part such as by spring locking, threaded or bayonet joints, etc.

The various features of novelty which characterize the invention are pointed out with particularly in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

What is claimed is:

1. An adapter for a gas system including a gas supply line terminating in a gas supply inlet opening and having a spring-loaded supply valve in said gas supply line biased against the opening to close it and which is engageable by a gas distributing line having an end with an inlet plug with a distributor flow passage defined therethrough and which end is insertable into the gas supply line inlet opening and engageable against the supply valve to displace it away from the inlet opening and with a flow passage having an opening which communicates with the supply line for the flow of gas from the supply line through the flow passage of the inlet plug, comprising an adapter body comprising an adaptor plug portion with a first end and with an interior defining an adaptor flow passage therein from said first end to an opposite second end of said adaptor plug, said first end having an opening to communicate the interior adaptor flow passage with the supply line, said adaptor body having filter means in said adaptor flow passage and having said second end opposite to said first end with an adaptor outlet opening and having an interior defining a receiving part having said outlet opening of the size to receive the gas distributing line inlet end, an outlet valve in said adaptor flow passage disposed adjacent said second end in a position to close said second end and said outlet opening means biasing said adaptor outlet valve to close said second end, said distributor line inlet plug being insertable into said adaptor outlet opening to displace said outlet valve and communicate said adaptor flow passage with said distributor flow passage.

2. An adaptor according to claim 1 wherein said adaptor body comprises a cylindrical body portion having a side with a recess therein forming a receiving socket for the distributor line plug, said filter means including an annular filter mounted on the interior of said cylindrical portion said distributor flow passage including a flow passage from said first end in a path between said filter and the exterior wall of said cylindrical portion and through said filter to the interior of said filter through said outlet opening of said adaptor.

3. An adaptor according to claim 1 wherein said adaptor body has means for threading said adaptor body into engagement with said gas supply line.

4. An adaptor according to claim 1 wherein said adaptor body comprises a tubular member having a through flow passage defined therein from said first end to said second opposite end, said filter means comprising a filter in said through flow passage of a material permitting fluid flow therethrough.

5. An adaptor according to claim 1 including means at said second end for resiliently engaging the distributor plug when the distributor plug is inserted into the outlet opening of said distributor body.

* * * * *